May 12, 1931. H. H. GLASIER 1,804,412
TRACTION FRAME
Filed March 1, 1930 2 Sheets-Sheet 1
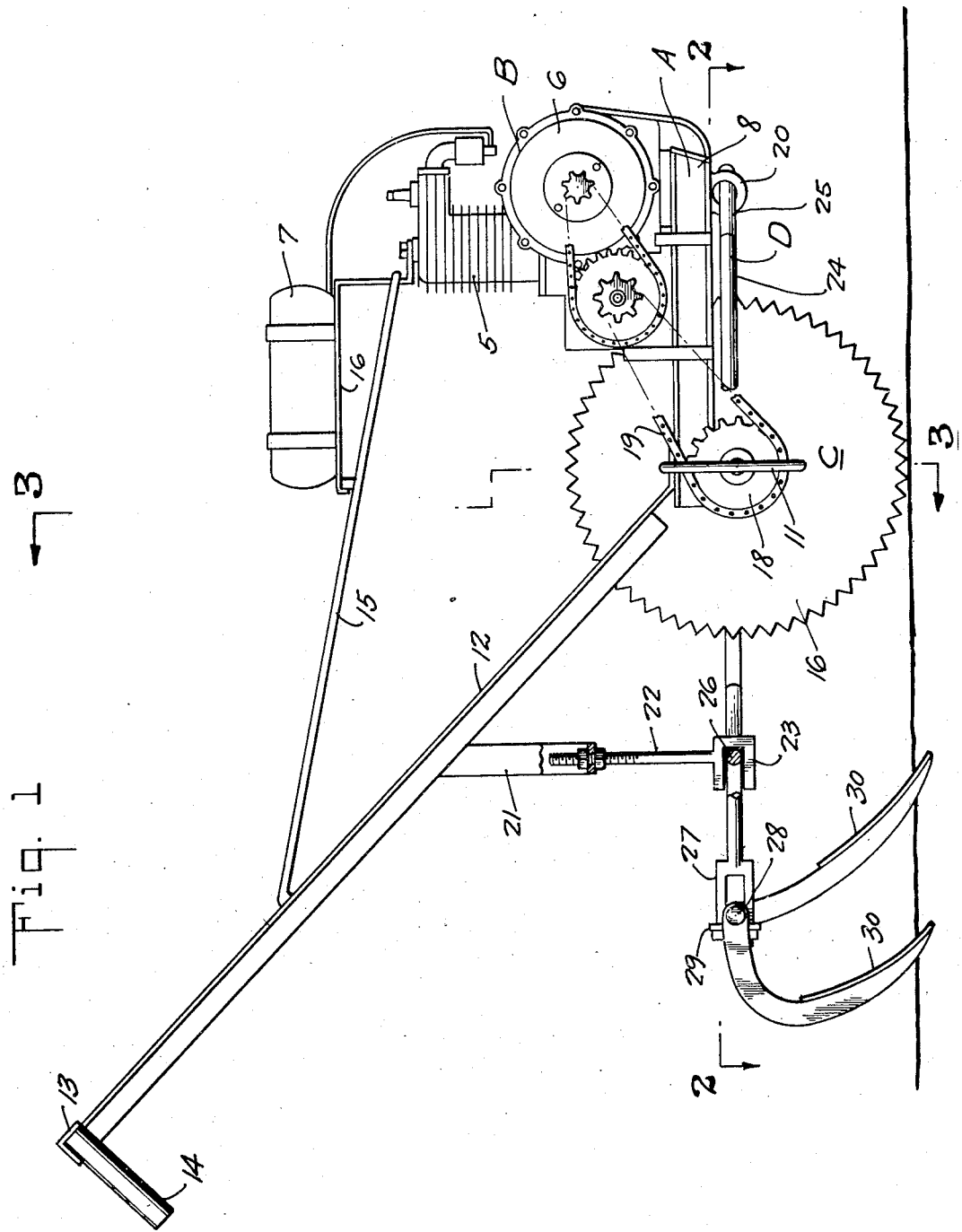
INVENTOR
Harold H. Glasier
BY
Westall and Wallace
ATTORNEYS May 12, 1931.  H. H. GLASIER  1,804,412
TRACTION FRAME
Filed March 1, 1930   2 Sheets-Sheet 2
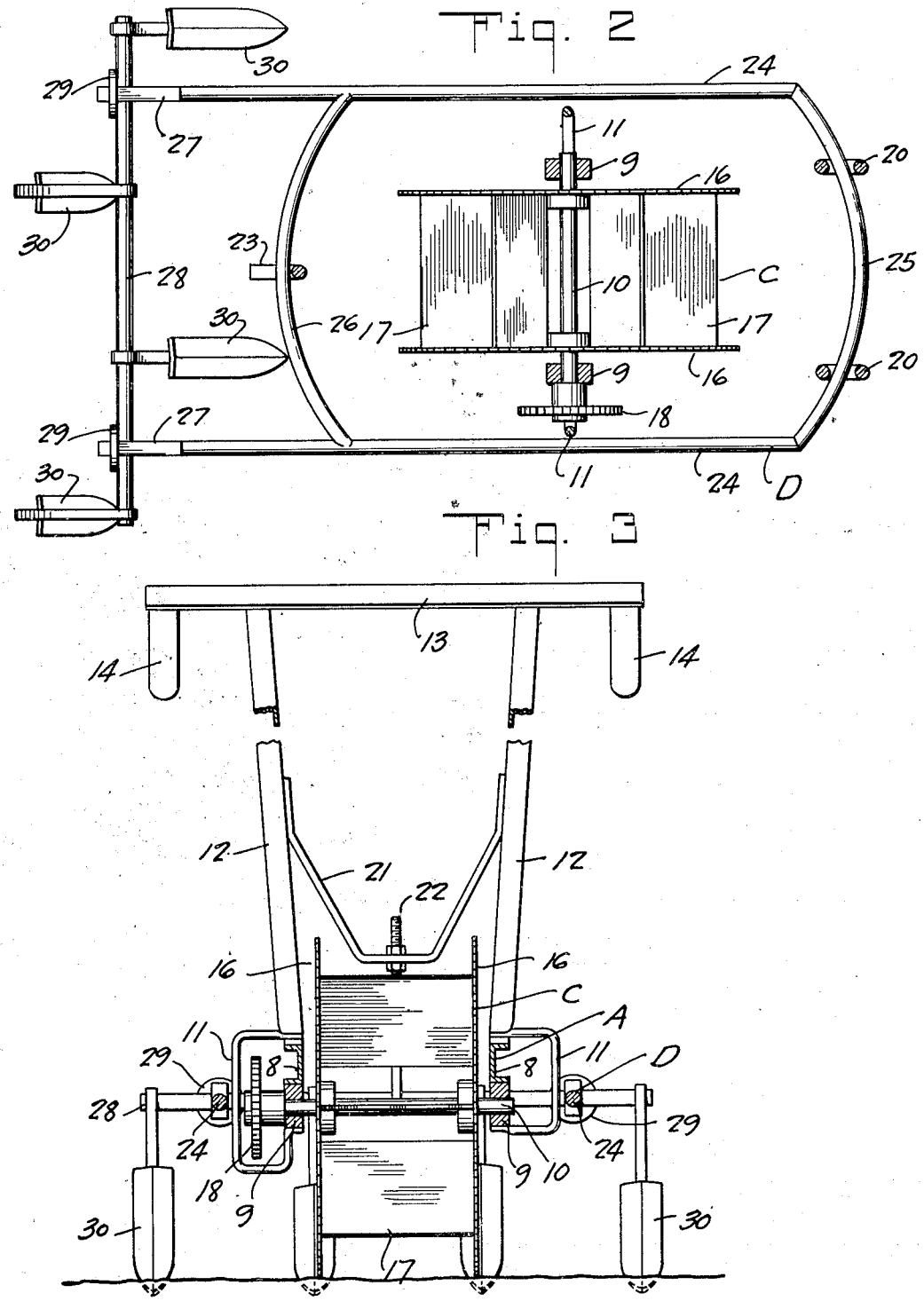
INVENTOR
Harold H. Glasier
BY
Westall and Wallace
ATTORNEYS Patented May 12, 1931

1,804,412

UNITED STATES PATENT OFFICE

HAROLD H. GLASIER, OF LOS ANGELES, CALIFORNIA

TRACTION FRAME

Application filed March 1, 1930. Serial No. 432,410.

This invention relates to an agricultural implement designed to be power driven. The particular structure shown herein is especially adapted for working small plots of ground, although in no way limited to such use. The embodiment of the invention shown herein is a self propelled implement intended to be guided by an operator who follows the implement. The present invention appertains particularly to a device of the character described having a trailer frame on which ground working tools may be mounted.

In self propelled implements of the character described, it is the common practice to hitch the ground working tools to the frame supporting the power plant and carried by the tractor wheel or wheels. There is thus a rigid connection which makes turning difficult in a short radius. The present invention has for its primary object the provision of an implement having a trailer frame which may swing from side to side and follow the tractor wheel, the tractor device being turnable with respect to the trailer so as to effect easy steering.

These objects together with other objects and corresponding accomplishments are obtained by means of the embodiment of my invention illustrated in the accompanying drawings, in which:—

Fig. 1 is a side elevation with a portion of the trailer frame shown in sections; Fig. 2 is a section as seen on the line 2—2 of Fig. 1; and Fig. 3 is a section as seen on the line 3—3 of Fig. 1.

Referring more particularly to the drawings, A indicates a tractor frame supporting a power plant B and carried by a tractor wheel C. The trailer frame is indicated by D and has ground working tools attached thereto. The power plant may be of the conventional type comprising a gas engine 5, a transmission indicated generally by 6 and a fuel tank 7. The power plant is supported upon the front end of the tractor frame. The tractor frame comprises side bars 8 having bearing blocks 9 in which is journalled the traction wheel shaft 10. Loop shields 11 extend outwardly from the side bars 9. Secured to the tractor frame and forming a part thereof are guide bars 12 connected at the top by a cross piece 13 and having handles 14 to be grasped by the operator. A brace member 15 extends from the top of the engine 5 to the guide bars 12 and serves to support the fuel tank by an intermediate base 16. The traction wheel unit is in effect a single wheel so that the tractor is of a unicycle type. It comprises serrated disks 16 connected by plates 17 to provide maximum traction in soft ground. Mounted on shaft 10 is a sprocket wheel 18 which is geared to a sprocket pinion in the transmission by means of a sprocket chain 19. At the forward end of the frame are eyes 20 to receive the trailer frame yoke. Spanning the guide bars 12 is a stirrup bar 21 depending from the guide bars and having attached thereto a rod 22 provided at its lower end with a yoke slide 23.

The trailer frame comprises trace bars 24 connected at the front by an arcuate yoke 25 which is roven through the eyes 20. The trace bars are astride of the tractor frame and the trailer frame may swing laterally with relation to the tractor frame. Joining the trace bars adjacent their rear ends is an arcuate span bar 26 which is disposed within the mouth of slide yoke 23. The trace bars are extended toward the rear and are bifurcated as indicated by 27 to receive cross bar 28 carrying the ground working tools. The ends of the trace bars are closed by disks 29 held in place by any suitable means. The cross bar 28 is shown with cultivator blades mounted thereon and marked 30. However, plow shares, harrows or any other suitable ground working tools may be mounted upon the cross bars. The cross bar is detachable so that tools may be substituted.

The tractor is steered and guided by means of the handles, and it is obvious that it may be turned regardless of the line of direction of the ground working tools. In making a turn, the tractor will turn within the trailer frame, and the trailer frame will be compelled to follow the tractor. The slide 23 at the rear permits swinging movement of the trailer frame but does not permit up and down movement with respect to the tractor frame. Thus the depth of penetration of the tools may be controlled by the operator. The weight of the power plant being concentrated at the front balances the structure, and makes it easy to lift the ground working tools so that a very short turn may be made. However, where it is desired that the ground working tools follow, they are maintained in the ground during turning. Obviously, by reason of the permissible side movements of the ground tools, they are better able to follow the tractor without placing any undue work upon the operator to maintain the tractor in its general forward straight line movement. Although a tractor is shown with one wheel, it is obvious that the invention in its broad aspect is not limited to such type of tractor, as additional ground wheels to support the parts may be employed.

What I claim is:—

1. An agricultural implement having a tractor frame adapted to support the power plant and including guide handles, a tractor wheel carrying said tractor frame; a trailer frame having trace bars connected by a yoke at the front, said yoke having a swinging connection to the front of said tractor frame, and ground working tools at the rear of said trailer frame.

2. An agricultural implement having a tractor frame adapted to support the power plant and including guide handles, a tractor wheel carrying said tractor frame; a trailer frame having trace bars connected by a yoke at the front, said yoke having a swinging connection to the front of said tractor frame, a slide connection between the rear of said trailer and tractor frames enabling lateral swinging movement and restraining up and down movement of said frames in relation to one another, and ground working tools at the rear of said trailer frame.

3. An agricultural implement having a tractor frame adapted to support the power plant and including guide handles, a tractor wheel carrying said tractor frame; a trailer frame having spaced parallel trace bars connected by an arcuate yoke at the front, eyes at the front of said tractor frame through which said yoke is roven to provide swinging connection and ground working tools at the rear of said trailer frame.

4. An agricultural implement having a tractor frame adapted to support the power plant and including guide handles, a tractor wheel carrying said tractor frame; a trailer frame having spaced parallel trace bars connected by an arcuate yoke at the front, an eye at the front of said tractor frame through which said yoke is roven to provide a swinging connection, an arcuate span bar extending between said trace bars adjacent their rear ends, a slide connection between said frames enabling lateral swinging movement and restraining up and down movement of said frames in relation to one another and ground working tools at the rear of said trailer frame.

5. An agricultural implement having a tractor frame adapted to support the power plant and including guide handles, a tractor wheel carrying said tractor frame; a trailer frame having trace bars connected by a yoke at the front, said yoke having a swinging connection to the front of said tractor frame and a detachable cross bar at the rear of said trace bars adapted to carry ground working tools, ground working tools at the rear of said trailer frame.

6. An agricultural implement having a tractor frame, an unicycle tractor wheel means, a power plant supported on said tractor frame forward of the axis of said wheel means, said tractor frame including guide handles extending from said tractor frame toward the rear; a trailer frame having trace bars connected by a yoke at the front, said yoke having a swinging connection to the front of said tractor frame and ground working tools secured to the rear of said frame.

7. An agricultural implement having a tractor frame, a unicycle tractor wheel means, a power plant supported on said tractor frame, said tractor frame including guide handles extending from said tractor frame; a trailer frame having parallel spaced trace bars connected by an arcuate yoke at the front, an eye at the front of said tractor frame through which said yoke is roven to provide a swinging connection, and ground working tools secured to the rear of said frame.

8. An agricultural implement having a tractor frame, a unicycle tractor wheel means, a power plant supported on said tractor frame, said tractor frame including guide handles extending from said tractor frame; a trailer frame having parallel spaced trace bars connected by an arcuate yoke at the front, an eye at the front of said tractor frame through which said yoke is roven to provide a swinging connection to the front of said tractor frame and a detachable cross bar at the rear of said trace bars adapted to carry ground working tools.

9. An agricultural implement having a tractor frame, an unicycle tractor wheel means, a power plant supported on said tractor frame forward of the axis of said wheel means, said tractor frame including guide handles extending from said tractor frame toward the rear; a trailer frame having parallel spaced trace bars connected by an arcuate yoke at the front, an eye at the front of said tractor frame through which said yoke is roven to provide a swinging connection to the front of said tractor frame and a detachable cross bar at the rear of said trace bars adapted to carry working tools.

10. An agricultural implement having a tractor frame, an unicycle tractor wheel means, a power plant supported on said tractor frame forward of the axis of said wheel means, said tractor frame including guide handles extending from said tractor frame toward the rear; a trailer frame having spaced trace bars mounted astride said tractor wheel means and having a swinging connection to said tractor frame and ground working tools secured to the rear of said frame.

In witness that I claim the foregoing I have hereunto subscribed my name this 20th day of February, 1930.

HAROLD H. GLASIER.